Patented May 19, 1953

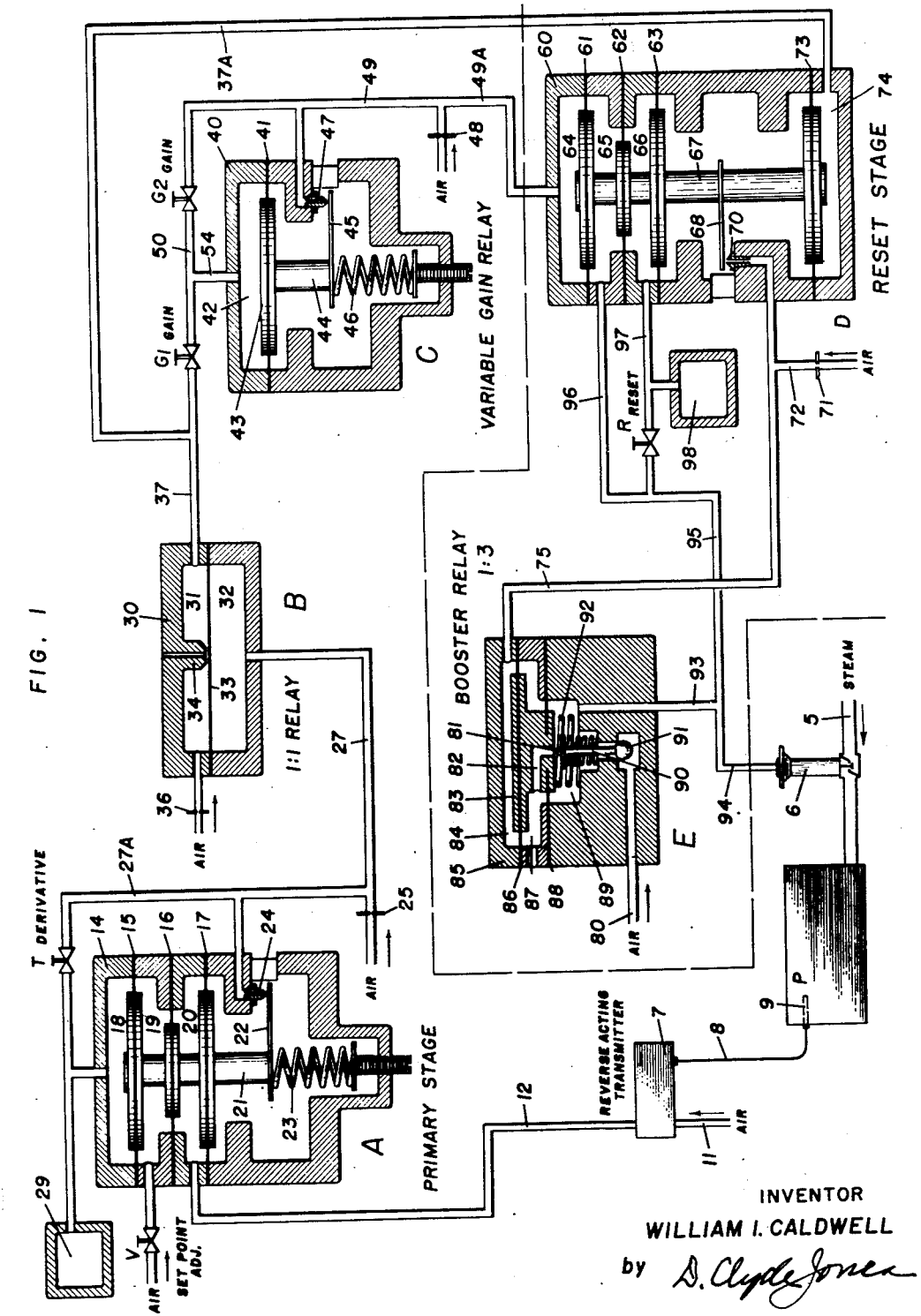

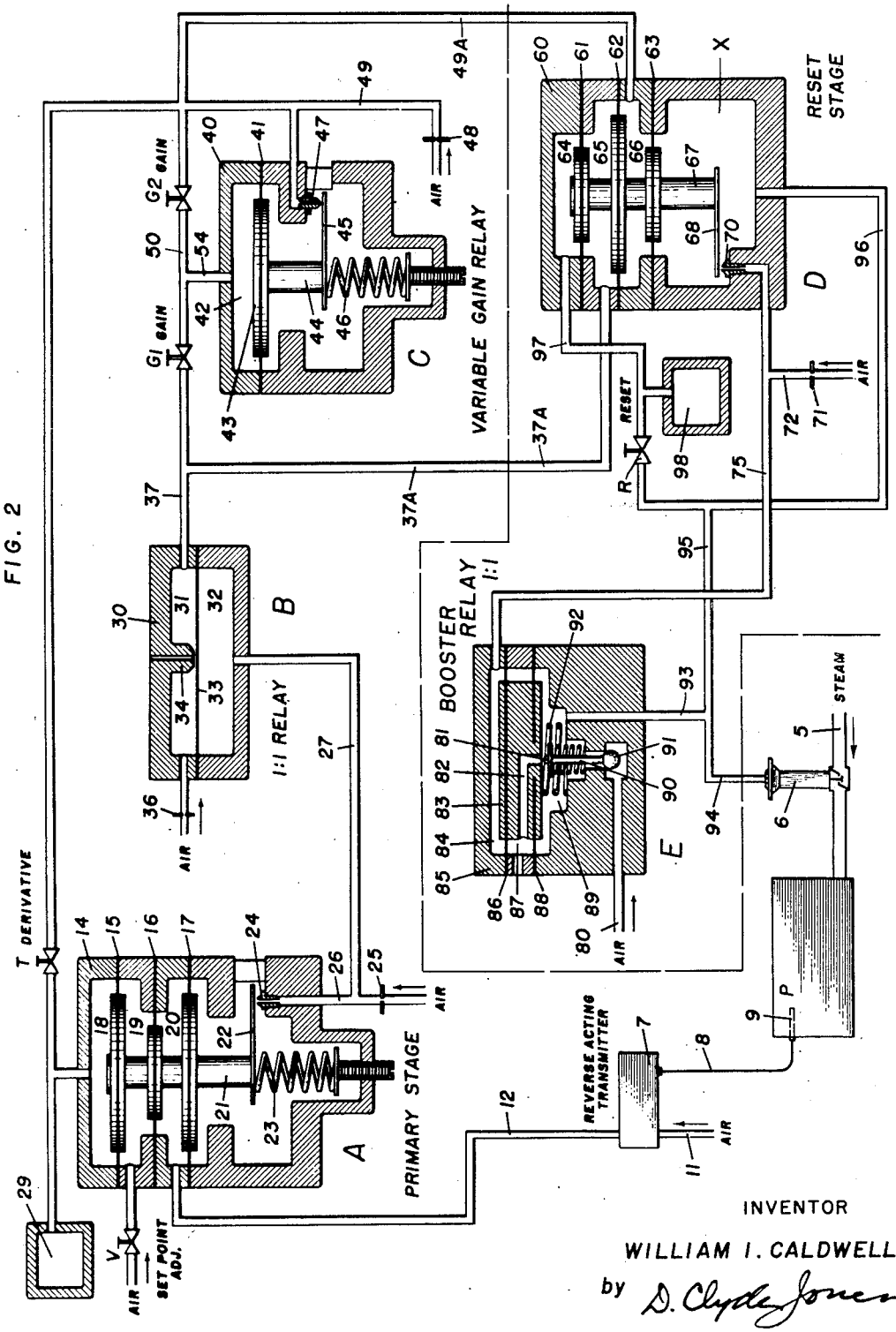

2,638,922

UNITED STATES PATENT OFFICE 2,638,922

PNEUMATICALLY OPERATED CONTROL SYSTEM

William I. Caldwell, Rochester, N. Y., assignor to Taylor Instrument Companies, Rochester, N. Y., a corporation of New York Application June 9, 1951, Serial No. 230,831

8 Claims. (Cl. 137—492)

This invention relates to a pneumatically operated control system for maintaining a process variable such as temperature, pressure, rate of flow, liquid level and the like, at a predetermined value.

The present invention has for its purpose the production of a control system which will maintain highly accurate control of a process variable under extreme adverse conditions, which is simple to adjust and which is relatively inexpensive to manufacture.

The various features and advantages of the invention will appear from the detailed description and claims when taken with the drawings in which Fig. 1 is a diagrammatic showing of the control system of the present invention; and Fig. 2 is a diagrammatic illustration of a modified form of the invention.

Referring to Fig. 1 of the drawings there is illustrated, by way of example, a system for the control of temperature of a given process P to which steam is supplied through the pipe 5 under the control of a diaphragm motor valve 6, the valve 6 being controlled by the system to admit the proper amount of steam into the process to maintain it at the desired temperature. The system includes a primary stage or unit A, a one-to-one isolating relay B, a variable gain stage C, a reset stage D and a booster relay E.

The temperature of the process is sensed by a temperature transmitter 7 including a capillary tube 8 of the tube system which terminates in a bulb 9 exposed to the process medium. This transmitter may be similar in construction to that disclosed in the patent to Matner et al., 2,536,198 granted January 2, 1951. The temperature transmitter 7 should be of the reverse acting type, namely, it transmits air or the like under pressure from the source 11, at a signal pressure proportional to the negative of the value of the change in temperature sensed at the bulb 9. This proportional pressure is communicated through the pipe 12 to the primary stage A.

The primary stage comprises a casing 14 with parallel diaphragms 15, 16 and 17 of the effective areas indicated, sealed at their margins to the inner wall of the casing to define the chambers 18, 19 and 20. The centers of the diaphragms are secured in sealed relation to a pillar 21 to move it up or down depending on the resultant of the forces on the several diaphragms, caused by the pressures in the chambers 18, 19 and 20. The pillar 21, which is normally biased upward by a spring 23, carries the left end of baffle 22. The right end of the baffle cooperates with a nozzle 24 to constitute a control couple. The signal pressure in the pipe 12 is applied to chamber 20 and fluid at a selected pressure determined by the manually operated pressure reducing valve V, which determines the set point or desired temperature of the system, is applied to the chamber 19. A follow-up pressure from the output of the primary stage, as will be described is applied through branch pipe 27A to the chamber 18 of this stage. Fluid under pressure, such as compressed air under uniform pressure, is supplied through restriction 25 and pipe 27A to nozzle 24 where it bleeds to the atmosphere at a rate depending on the spacing between the baffle 22 and nozzle 24. This action controls the output pressure in pipe 27 which communicates through branch pipe 27A and the adjustable restriction or needle valve T, with the chamber 18, and the capacity 29. If the adjustable restriction T is closed so that no air can flow through it, a small change in pressure in chamber 20 will cause a change in the spacing between baffle 22 and nozzle 24 which will result in a relatively large change in pressure in pipe 27. If the adjustable restriction T is not closed a change in pressure in chamber 20 will be followed by a change in chamber 18 in the opposite sense, which change in 18 will reduce the change in spacing between baffle 22 and nozzle 24 that results from the action of the pressure change in chamber 20, thereby reducing the change in pressure in pipe 27. This reduction in change in pressure in pipe 27 does not occur instantly because of the time required to change the pressure in chamber 18 and capacity 29 through adjustable restriction T. As is well known in the art the consequent pressure change in pipe 27 is proportional to the output of the transmitter 7 and to the rate of change or derivative of the output of transmitter 7.

It should be noted that when the set point pressure in chamber 19 and the transmitted signal pressure in chamber 20 are constant and equal, the equilibrium pressure in chamber 18 can be set at a chosen intermediate value in the range between zero pressure and the pressure of the source, which may be twenty pounds per square inch, by adjustment of the compression of spring 23.

The isolating one-to-one relay B comprises a casing 30 which is divided into an upper chamber 31 and a lower chamber 32 by a diaphragm 33 which has its margin sealed in the walls of the casing to prevent fluid from passing from one of these chambers to the other. A source of compressed air at uniform pressure is supplied through restriction 36 to the chamber 31 while the controlled pressure in branch pipe 27 is applied to chamber 32. The top of the casing is provided with an inwardly directed nozzle 34 exhausting the chamber 31 to the atmosphere, under the control of the diaphragm 33 which cooperates with the nozzle to vary the escape of fluid therethrough. The operation of the isolating relay B is such that the output pressure in pipe 37 is equal to the input pressure in pipe 27 but this output pressure cannot react back on the input pressure in pipe 27.

The pipe 37 communicates with the relay of stage C which comprises a casing 40 provided with a flexible diaphragm 41 sealed thereto, to define a chamber 42. A disc 43 mounted on this diaphragm has a downwardly projecting lug 44 which carries the left end of baffle 45, the lug being biased upward by a spring 46. The right end of the baffle 45 cooperates with a nozzle 47 to constitute a control couple. A source of compressed air at a uniform pressure is supplied through restriction 48 and the pipe 49, to the nozzle 47 where it escapes to the atmosphere under the control of the baffle 45 thereby varying the back pressure in pipe 49. An increase in pressure in chamber 42 results in a decrease in pressure in pipe 49. Pipe 49 communicates this varying back pressure to the chamber 64 of the reset stage D.

A pressure divider supplies fluid under controlled pressure to the chamber 42 of the variable gain relay stage. This pressure divider comprises a pipe 50 having restrictions or adjustable needle valves G1 and G2 connected in series therein. One end of pipe 50 communicates with the output pipe 37 of the isolating relay while the other end of pipe 50 communicates with the output pipe 49 of the relay C. A pipe 54 communicating with pipe 50 at a point between the restrictions G1 and G2 leads to chamber 42 to supply pressure thereto for operating the relay C. This pressure divider provides means for adjusting the sensitivity of the system, that is, the amount that motor valve 6 opens or closes for a given change in temperature.

The ratio of the pressure change in pipe 49, to the pressure change in pipe 37, is the gain of the relay. It should be pointed out that the effective area of the diaphragm 41 of chamber 42 and the spring rate of spring 46 are so chosen that the gain of the relay C with restriction G2 closed, is relatively large, for example, 100 times. Therefore, to move baffle 45 from a capped position to a fully uncovered position requires a relatively small change in the pressure in the chamber 42, for example 0.2 of a pound per square inch. Consequently, in normal operation, the pressure in chamber 42 is nearly constant.

By suitable selection of the circuit constants, the operation of the parts of the circuit so far described will not be changed by connecting pipe 27 directly to pipe 37 and removing the isolating relay B. It is also obvious that in practice only one of the restrictions G1 and G2 needs to be adjustable.

It is desirable to be able to adjust the resistance to flow of either G1 and G2 or both to change the gain of relay C without causing any change in pressure in pipe 49 when the pressure in pipe 37 is at the chosen intermediate value as described above. That is, when the pressure in chambers 19 and 20 of the primary stage are constant and equal and thus the equilibrium pressure in chamber 18, pipe 27 and pipe 37 are all at the chosen intermediate value, it is desirable to be able to adjust G1 and G2 or both without causing any change in pressure in pipe 49. This is accomplished by preadjusting the compression in spring 46 of relay C so that the pressure in pipe 49 is at this chosen intermediate value when the pressure in chamber 42 is also at this same value of pressure. Inasmuch as the pressures in chamber 42 and pipe 49, under this condition, will therefore, be at the chosen intermediate value when the pressure in pipe 37 is constant and at this same value of pressure, there will be no flow through restrictions G1 and G2 so that adjustment of either restriction at this time will not cause a change in value of pressure in pipe 49. Consequently, after this preadjustment of spring 46 has been made, the pressures in chamber 18, pipe 37, chamber 42 and pipe 49 will all be at the chosen intermediate value when the signal pressure in pipe 12 is constant and equal to the set point pressure in chamber 19 regardless of what the set point pressure may be.

The reset stage D comprises a casing 60 which with the parallel diaphragms 61, 62, 63 and 73 sealed thereto, provides a primary chamber 64, a secondary chamber 65, a tertiary chamber 66 and a biasing chamber 74. Pressure from the pipe 49 of the variable gain relay stage C is communicated to the primary chamber 64 while pressure in the pipe 37 leading to the pressure divider of the variable gain relay C, is also communicated through branch pipe 37A to the biasing chamber 74. A pillar 67 connected to the centers of these diaphragms, partakes of the resultant movement thereof to move in a vertical direction in response to changes in the pressures in the chambers of the reset stage. The intermediate portion of the pillar 67 carries the right end of a baffle 68, the left end of which cooperates with the nozzle 70 to constitute a control couple. A source of compressed air under uniform pressure is supplied through restriction 71 and pipe 72 to the output pipe 75 from which it bleeds to the atmosphere through nozzle 70 under the control of the baffle 68. The action of the baffle throttles the pressure in the output pipe 75, communicating with the chamber 84 of the booster relay E to which relay air under uniform pressure is supplied through pipe 80.

The booster relay comprises a casing 85 including a top cap, an intermediate ring and a bottom portion separated by diaphragms 86 and 88 to define the chambers 84, 87 and 89. The diaphragms are connected at their centers to a pillar 83 so that they operate as a unit against the biasing action of spring 92, in response to the difference in pressures applied to their respective surfaces. The pillar 83 has a passage 82 therein leading to chamber 87 which communicates with the atmosphere through an opening in the intermediate ring. Pillar 83 has a valve seat at the entrance to the passage 82 controlled by a ball valve 81 provided at the upper end of an upwardly spring-biased valve stem 90 and governing the flow of air through the passage. Compressed air is supplied through the pipe 80 into chamber 89 under the control of a ball valve 91 carried on the lower end of the valve stem 90, and cooperating with a seat formed in the casing at the entrance to chamber 89. The pressure in the chamber 89 is applied to the diaphragm 88 tending to oppose the action of the pressure applied to diaphragm 86 comprising a part of the chamber 84. Throttled compressed air is supplied from the chamber 89 through the pipes 93 and 94 which communicate with the diaphragm motor of valve 6. This tends to position valve 6 so that the proper amount of steam is supplied through the pipe 5, to correct any deviation from the desired value of the process. The pipe 93 also communicates through the branch pipes 95 and 96 with the chamber 65 in the reset unit D to effect a balance with the incoming pressures which are supplied to the chambers 64 and 74, and through pipe 95, restriction R and pipe 97 with chamber 66 of the reset unit D.

Spring 92 of the booster relay E is preferably adjusted so that when the pressure in chamber 64 of the reset stage is constant and at the chosen intermediate pressure of the primary stage A, the pressures in pipe 95 and in the chambers 65 and 66 are all at the same pressure, which is not necessarily the intermediate pressure referred to above. With this initial condition, an increase in pressure in chamber 64 will result in a proportional increase in pressure in pipe 95 and chamber 65. This increase in pressure in line 95 will also be transmitted with a time lag through restriction R and pipe 97 to chamber 66 and capacity tank 98. As the pressure in chamber 66 increases, a further increase in pressure in pipe 95 and chamber 65 will result. As is well known in the art, the use of restriction R, associated capacity 98 and chamber 66, results in the output of stage D and its booster relay being proportional to input of chamber 64 and proportional to the time integral of the input to chamber 64. This response is commonly known as Proportional plus Reset Response. The Reset Response Rate may be adjusted by adjusting the resistance of restriction R which restriction is preferably a needle valve.

It has been indicated that the output of primary stage A gives Derivative Response and Proportional Response. These responses are exhibited in the input pressure to chamber 64 of the reset relay with consequent output pressure to the diaphragm motor valve 6 which has Reset, Proportional and Derivative responses.

In the modified form of the invention as illustrated in Fig. 2 there is disclosed a system for the control of temperature of a given process P to which steam is supplied through the pipe 5 under the control of a diaphragm motor valve 6, the valve 6 being controlled by the system to admit the proper amount of steam into the process to maintain it at the desired temperature. The system includes a primary stage or unit A, a one-to-one isolating relay B, a variable gain relay stage C, a reset stage D, and a booster relay E.

The temperature of the process is sensed by a temperature transmitter 7 including a capillary tube 8 of a tube system which terminates in a bulb 9 exposed to the process medium. This transmitter may be similar in construction to that disclosed in the mentioned patent to Matner et al. The temperature transmitter 7 transmits air under pressure from the source 11, at a signal pressure proportional to the negative of the value of the change in temperature sensed at the bulb 9. This proportional pressure is communicated through the pipe 12 to the primary unit A herein referred to as the primary stage.

The primary stage comprises a casing 14 with parallel diaphragms 15, 16 and 17 sealed at their margins by being clamped in the sidewall of the casing, to define the chambers 18, 19 and 20. The centers of the diaphragms are secured in sealed relation to a pillar 21. The pillar 21 carries the left end of baffle 22 which pillar is biased upward by compression spring 23. The forces on the several diaphragms, caused by the pressures in the chambers 18, 19 and 20 produce a resultant force which tends to move pillar 21 up or down thereby moving baffle 22 with respect to nozzle 24.

The signal pressure in the pipe 12 is applied to the chamber 20 of unit A while a selected control pressure, which determines the set point or desired control temperature of the system, is applied to the chamber 19. The selected control pressure is preferably adjusted by a manually operated pressure reducing valve V.

A feedback pressure governed by the variable gain relay stage C as will be described, is applied to the chamber 18, the variable gain relay stage being controlled by the output pressure of the one-to-one isolating relay B which is governed by the output pressure in pipe 27 of the primary stage.

Fluid under pressure, such as compressed air under uniform pressure is supplied through restriction 25 and pipe 26, to nozzle 24 where it bleeds to the atmosphere depending on the spacing between the baffle 22 and the nozzle 24. This action controls the output pressure in pipe 26 which communicates through branch pipe 27 and the one-to-one isolating relay B, with a pressure dividing network forming a part of the variable gain relay stage C, for a purpose to be described. It will be noted that this variable gain relay is effectively connected in a feedback circuit from the output pipe 27 of the primary stage A to the chamber 18 of this stage, thereby providing a sensitivity control for the system whereby the amount of movement of valve 6 for any given temperature change can be effected at will.

As is well known in the art, the use of restriction T in the feedback pressure line to chamber 18 results in Derivative Response in addition to the Proportional Response just described. The time constant of the Derivative response may be adjusted by adjusting the resistance of restriction T, which restriction is preferably a needle valve. The Derivative time constant also depends upon the capacity associated with chamber 18. A capacity tank such as 29 may be used to increase the Derivative time constants obtainable.

It should be noted that when the set point pressure in chamber 19 and the transmitted signal pressure in chamber 20 are constant and equal, the equilibrium pressure in chamber 18 can be set at a chosen intermediate value in the range between zero pressure and the pressure of the source, which may be twenty pounds per square inch, by adjustment of the compression of spring 23.

The isolating one-to-one relay B comprises a casing 30 which is divided into an upper chamber 31 and a lower chamber 30 by a diaphragm 33 which has its margin sealed in the walls of the casing to prevent fluid from passing from one of these chambers to the other. A source of compressed air at uniform pressure is supplied through restriction 36 to the chamber 31 while the controlled pressure in branch pipe 27 is applied to chamber 32. The top of the casing is provided with an inwardly directed nozzle 34 exhausting the chamber 31 to the atmosphere, under the control of the diaphragm 33 which cooperates with the nozzle to vary the escape of fluid therethrough. The operation of the isolating relay B is such that the output pressure in pipe 37 is equal to the input pressure in pipe 27 but this output pressure cannot react back on the input pressure in pipe 27.

The pipe 37 communicates with the relay of stage C which comprises a casing 40 provided with a flexible diaphragm 41 sealed thereto, to define a chamber 42. A disc 43 mounted on this diaphragm has a downwardly projecting lug 44 which carries the left end of baffle 45, the lug being biased upward by a spring 46. The right end of the baffle 45 cooperates with a nozzle 47 to constitute a control couple. A source of compressed air at a uniform pressure is supplied through restriction 48 and the pipe 49, to the nozzle 47 where it escapes to the atmosphere under the control of the baffle 45 thereby varying the back pressure in pipe 49. An increase in pressure in chamber 42 results in a decrease in pressure in pipe 49. Pipe 49 communicates this varying back pressure to the chamber 18 of the primary stage A.

A pressure divider supplies fluid under controlled pressure to the chamber 42 of the variable gain relay stage. This pressure divider comprises a pipe 50 having restrictions or adjustable needle valves G1 and G2 connected in series therein. One end of pipe 50 communicates with the output pipe 37 of the isolating relay while the other end of pipe 50 communicates with the output pipe 49 of the relay C. A pipe 54 communicating with pipe 50 at a point between the restrictions G1 and G2 leads to chamber 42 to supply pressure thereto for operating the relay C. This pressure divider provides means for adjusting the sensitivity of the system, that is, the amount that motor valve 6 opens or closes for a given change in temperature.

The ratio of the pressure change in pipe 49, to the pressure change in pipe 37, is the gain of the relay. It should be pointed out that the effective area of the diaphragm 41 of chamber 42 and the spring rate of spring 46 are so chosen that the gain of the relay C with restriction G2 closed, is relatively large, for example, 100 times. Therefore, to move baffle 45 from a capped position to a fully uncovered position requires a relatively small change in the pressure in the chamber 42, for example 0.2 of a pound per square inch. Consequently, in normal operation, the pressure in chamber 42 is nearly constant.

By suitable selection of the circuit constants, the operation of the parts of the circuit so far described will not be changed by connecting pipe 27 directly to pipe 37 and removing relay B. It is also obvious that in practice only one of the restrictions G1 and G2 needs to be adjustable.

As was pointed out in connection with the Fig. 1 embodiment, the compression spring 46 of relay stage C may be preadjusted when the pressure in pipe 37 is at the chosen intermediate value until, with this same value in chamber 42, the same pressure is also present in pipe 49 so that restriction G1 and G2 or both may be adjusted to change the gain of the relay stage C without causing any change in pressure in pipe 49.

The reset stage D comprises a casing 60 which with the parallel diaphragms 61, 62 and 63 sealed thereto, provides a primary chamber 64, a secondary chamber 65, a tertiary chamber 66 and a chamber X. Pressure in the output pipe 37 of the isolating relay B is communicated through branch pipe 37A to the chamber 65. A pillar 67 connected to the centers of these diaphragms, partakes of the resultant movement thereof to move in a vertical direction in response to changes in the pressures in the chambers of this reset stage. The lower end of the pillar 67 carries the right end of a baffle 68. The left end of the baffle cooperates with the nozzle 70 to constitute a control couple, the nozzle being submerged in chamber X. A source of compressed air under uniform pressure is supplied through restriction 71 and pipe 72 to the output pipe 75 from which it bleeds to chamber X through nozzle 70 under the control of the baffle 68. The action of the baffle throttles the pressure in the output pipe 75, communicating with the chamber 84 of the booster relay E to which air under uniform pressure is supplied through pipe 80.

The booster relay, which is of the one-to-one type, comprises a casing 85 including a top cap, an intermediate ring and a bottom portion separated by diaphragms 86 and 88 to define the chambers 84, 87 and 89. The diaphragms are connected at their centers to a pillar 83 so that they operate as a unit against the biasing action of spring 92, in response to the difference in pressures applied to their respective surfaces. The pillar 83 has a passage 82 therein leading to chamber 87 which communicates with the atmosphere through an opening in the intermediate ring. Pillar 83 has a valve seat at the entrance to the passage 82, controlled by a ball valve 81 provided at the upper end of an upwardly spring-biased valve stem 90 and governing the flow of air through the passage. Compressed air is supplied through the pipe 80 into chamber 89 under the control of a ball valve 91 carried on the lower end of the valve stem 90, and cooperating with a seat formed in the casing at the entrance to chamber 89. The pressure in the chamber 89 is applied to the diaphragm 88 tending to oppose the action of the pressure applied to diaphragm 86 comprising a part of the chamber 84. Throttled compressed air is supplied from the chamber 89 through the pipes 93 and 94 which communicate with the diaphragm motor of valve 6. This tends to position valve 6 so that the proper amount of steam is supplied through the pipe 5, to correct any deviation from the desired value of the process. The pipe 93 also communicates through the branch pipes 95 and 96 with the chamber X in the reset unit D to effect a balance with the incoming pressure which is supplied to the chambers 65 and 66, and through pipe 95, restriction R and pipe 97 with chamber 64 of the reset unit D.

Spring 92 of the booster relay E is preferably adjusted so that when the pressure in chambers 65 and 66 of the reset stage are constant and at the chosen intermediate pressure of the primary stage A, the pressures in pipe 95 and in the chambers 64, and X are all at the same pressure which is not necessarily the intermediate pressure referred to above. With this initial condition an increase in pressure in chamber 65 will result in a proportional increase in pressure in pipe 95 and chamber X. This increase in pressure in line 95 will also be transmitted with a time lag through restriction R and pipe 97 to chamber 64 and capacity tank 98. As the pressure in chamber 64 increases, a further increase in pressure in pipe 95 and chamber X will result. As is well known in the art, the use of restriction R, associated capacity and chamber X results in the output of stage D and its booster relay being proportional to input of chambers 65 and 66 and proportional to the time integral of the input to chambers 65 and 66. This response is commonly known as Proportional plus Reset Response. The Reset Response Rate may be adjusted by adjusting the resistance of restriction R which restriction is preferably a needle valve.

It has been indicated that the output primary stage A gives Derivative Response and Proportional Response. These responses are exhibited in the input pressure to chambers 65 and 66 of the reset relay with consequent output pressure to the diaphragm motor valve 6 which is governed by Reset, Proportional and Derivative Responses.

The control system of Fig. 1 can be modified by substituting for the reset relay D and the booster relay E, at the right and below the broken line of that figure, the reset relay D with its submerged nozzle and the one-to-one booster relay E shown at the right and below the broken line of Fig. 2. In such substitution the pipes 37A and 49A of Fig. 2 will be connected to the pipes 37A and 49A of Fig. 1. When such substitution is made the transmitter 7 of Fig. 1 should be of the direct acting type, namely, the transmitter 7 should transmit under pressure through pipe 12 from source 11, at a signal pressure proportional to the temperature value sensed at the bulb 9.

Likewise the system shown in Fig. 2 can be modified by substituting for the reset relay D and the booster relay E at the right and below the broken line of that figure, the reset relay D and the one-to-three booster relay E shown at the right and below the broken line of Fig. 1. When such substitution is made the transmitter 7 of Fig. 2 should be of the direct acting type, namely, the transmitter 7 should transmit under pressure through pipe 12 from source 11, at a signal pressure directly proportional to the temperature value sensed at the bulb 9.

What I claim is:

1. In a system for maintaining a variable condition at a predetermined value, means for sensing changes in the value of the variable condition and for delivering fluid under modulated pressure proportional to the sensed change, a force balance reset stage having an output conduit and at least two chambers acting in opposition to each other, a selectively adjustable gain relay stage for coupling said reset stage to said means, a secondary source of fluid under a predetermined pressure, said relay stage having an input conduit and an output pipe and comprising a member responsive to fluid under pressure supplied through said input conduit and a valve associated with the output pipe of said relay stage operated by said member to vary the pressure of the fluid supplied to said relay stage output pipe from said secondary source, an input pipe communicating with the fluid under modulated pressure, a connecting conduit communicating with said input pipe and with said output pipe of said relay stage, two restrictions connected in series in said connecting conduit at least one of said restrictions being selectively adjustable, said input conduit communicating with said connecting conduit at a point between said restrictions whereby the pressure change of the fluid in said output pipe of said relay stage can be amplified or attenuated at will with respect to the pressure change of the modulated fluid, an additional source of fluid under pressure in communication with said output conduit of said reset stage, one of the chambers in said reset stage being responsive to the pressure of the fluid in one of said pipes and the other chamber being responsive to the pressure of the fluid in said other pipe for controlling operating fluid supplied to said output conduit of said reset stage from said additional source at a pressure proportional to the sensed change and proportional to the integral of the sensed change with respect to time, and mechanism responsive to said controlled operating fluid for restoring said condition to substantially said predetermined value.

2. In a system for maintaining a variable condition at a predetermined value, means for sensing changes in the value of the variable condition and for transmitting a fluid under pressure corresponding to the sensed change, a primary stage operated in response to the transmitted pressure for delivering fluid under modulated pressure proportional to the transmitted pressure, a force balance reset stage having an output conduit and at least two chambers acting in opposition to each other, a selectively adjustable gain relay stage for coupling said reset stage to said primary stage, a secondary source of fluid under a predetermined pressure, said relay stage having an input conduit and an output pipe and comprising a member responsive to fluid under pressure supplied through said input conduit and a valve associated with the output pipe of said relay state operated by said member to vary the pressure of the fluid supplied to said relay stage output pipe from said secondary source, an input pipe communicating with the source of modulated fluid, a connecting conduit communicating with said input pipe and with said output pipe of said relay stage, two restrictions connected in series in said connecting conduit at least one of said restrictions being selectively adjustable, said input conduit communicating with said connecting conduit at a point between said restrictions whereby the pressure change of the fluid in said output pipe of said relay stage can be amplified or attenuated at will with respect to the pressure change of the modulated fluid, an additional source of fluid under pressure in communication with said output conduit of said reset stage, one of the chambers in said reset stage being responsive to the pressure of the fluid in one of said pipes and the other chamber being responsive to pressure in said other pipe for controlling operating fluid supplied to said output conduit of said reset stage from said additional source at a pressure proportional to the sensed change and proportional to the integral of the sensed change with respect to time, and mechanism responsive to said controlled operating fluid for restoring said condition to substantially said predetermined value.

3. In a system for maintaining a variable condition at a predetermined value, means for sensing changes in the value of the variable condition and for transmitting fluid under pressure corresponding to the sensed change, a primary stage operated in response to the transmitted pressure for delivering fluid under modulated pressure proportional to the transmitted pressure, a force balance reset stage having an output conduit and at least two chambers acting in opposition to each other, a selectively adjustable gain relay stage for coupling said reset stage to said primary stage, a secondary source of fluid under a predetermined pressure, said relay stage having an input conduit and an output pipe and comprising a member responsive to fluid under pressure supplied through said input conduit and a valve related to the output pipe of said relay stage operated by said member to vary the pressure of the fluid supplied to said relay stage output pipe from said secondary source, an input pipe communicating with the source of modulated fluid, a connecting conduit communicating with said input pipe and with said output pipe of said relay stage, two restrictions connected in series in said connecting conduit at least one of said restrictions being selectively adjustable, said input conduit communicating with said connecting conduit at a point between said restrictions whereby the pressure change of the fluid in said output pipe of said relay stage can be amplified or attenuated at will with respect to the pressure change of the modulated fluid, means responsive to the pressure of the fluid in said output pipe for modifying the operation of the primary stage, an additional source of fluid under pressure in communication with said output conduit of said reset stage, one of the chambers in said reset stage being responsive to the pressure of the fluid in said input pipe and the other chamber being responsive to the pressure of the fluid in said output pipe of said relay stage for controlling operating fluid supplied to said output conduit of said reset stage from said additional source at a pressure proportional to the sensed change and proportional to the integral of the sensed change with respect to time, and mechanism responsive to said controlled operating fluid for restoring said condition to substantially said predetermined value.

4. In a system for maintaining a variable condition at a predetermined value, means for sensing changes in the value of the variable condition, a primary stage operated in response to a sensed change for delivering fluid under modulated pressure proportional to said change, a force balance reset stage having an output conduit and at least two chambers acting in opposition to each other, a selectively adjustable gain relay stage for coupling said reset stage to said primary stage, a secondary source of fluid under a predetermined pressure, said relay stage having an input conduit and an output pipe and comprising a member responsive to fluid under pressure supplied through said input conduit and a valve in communication with the output pipe of said relay stage operated by said member to vary the pressure of the fluid supplied to said relay stage output pipe from said secondary source, an input pipe communicating with the source of modulated fluid, a connecting conduit communicating with said input pipe and with said output pipe of said relay stage, two restrictions connected in series in said connecting conduit at least one of said restrictions being selectively adjustable, said input conduit communicating with said connecting conduit at a point between said restrictions whereby the pressure change of the fluid in said output pipe of said relay stage can be amplified or attenuated at will with respect to the pressure change of the modulated fluid, an additional source of fluid under pressure in communication with said output conduit of said reset stage, one of the chambers in said reset stage being responsive to the pressure of the fluid in one of said pipes and the other chamber in said reset stage being responsive to the pressure of the fluid in said other pipe for controlling operating fluid supplied to said output conduit of said reset stage from said additional source at a pressure proportional to the sensed change and proportional to the integral of the sensed change with respect to time, and mechanism responsive to said controlled operating fluid for restoring said condition to substantially said predetermined value.

5. In a fluid actuated system, a selectively adjustable gain relay having an input pipe to which a fluid under modulated pressure is supplied, and an output pipe, an auxiliary source of fluid under selectively adjustable predetermined pressure in communication with said output pipe, said relay comprising a member responsive to fluid under pressure supplied through an input conduit, a valve in communication with said output pipe operated by said member to vary the pressure of the fluid supplied to said output pipe from said auxiliary source, a connecting conduit communicating with said input pipe and with said output pipe, two restrictions connected in series in said connecting conduit, at least one of said restrictions being selectively adjustable, said input conduit communicating with said connection conduit at a point between said restrictions whereby the pressure differential between the pressures in the input pipe and in the output pipe can be amplified or attenuated at will with respect to the change in pressure in the input pipe, and a differential pressure responsive device having pressure chambers acting in opposition to each other, said chambers respectively communicating with said input pipe and with said output pipe.

6. In a fluid actuated system including a primary stage having an output pipe and proportional plus rate responses, a variable gain relay stage having an output pipe and an input pipe in communication with said primary stage output pipe and to which fluid under modulated pressure is supplied therefrom, an auxiliary source of fluid under selectively adjustable predetermined pressure in communication with said output pipe of said relay stage, said relay comprising a member responsive to fluid under pressure supplied through an input conduit, a valve associated with said relay output pipe operated by said member to vary the pressure of the fluid supplied to said relay output pipe from said auxiliary source, a connecting conduit communicating with said input pipe and with said relay output pipe, a pair of restrictions connected in series in said connecting conduit, at least one of said restrictions being selectively adjustable, said input conduit communicating with said connecting conduit at a point between said restrictions whereby the pressure differential between the pressures in the input pipe and in the relay output pipe can be amplified or attenuated at will with respect to the change in pressure in said input pipe, and a differential pressure responsive device having pressure chambers acting in opposition to each other, said chambers respectively communicating with said input pipe and with said output pipe.

7. In a fluid actuated system including a reset stage having proportional plus reset responses and a pair of pressure chambers actionable in opposition to each other, a relay stage having an input pipe to which a fluid under modulated pressure is supplied and an output pipe, an auxiliary source of fluid under selectively adjustable predetermined pressure in communication with said output pipe, said relay stage comprising a member responsive to fluid under pressure supplied through an input conduit, a valve in communication with said output pipe operated by said member to vary the pressure of the fluid supplied to said output pipe from said auxiliary source, a connecting conduit communicating with said input pipe and with said output pipe, a pair of restrictions connected in series in said connecting conduit, at least one of said restrictions being selectively adjustable, said input conduit communicating with said connecting conduit at a point between said restrictions whereby the pressure differential between the pressures in the input pipe and in the output pipe can be amplified or attenuated at will with respect to the change in pressure in said input pipe, said input pipe and said output pipes respectively communicating with said opposing chambers of said reset stage.

8. In a fluid actuated system including a primary stage having an output pipe and proportional plus rate responses and having a reset stage with proportional plus reset responses and a pair of pressure chambers actionable in opposition to each other, a relay stage having an input pipe in communication with said output pipe and to which fluid under modulated pressure is supplied therefrom, an auxiliary source of fluid under selectively adjustable predetermined pressure in communication with said output pipe of said relay stage, said relay comprising a member responsive to fluid under pressure supplied through an input conduit, a valve in communication with said relay output pipe operated by said member to vary the pressure of the fluid supplied to said relay output pipe from said auxiliary source, a connecting conduit communicating with said input pipe and with said relay output pipe, a pair of restrictions connected in series in said connecting conduit, at least one of said restrictions being selectively adjustable, said input conduit communicating with said connecting conduit at a point between said restrictions whereby the pressure differential between the pressures in the input pipe and in the relay output pipe can be amplified or attenuated at will with respect to the change in pressure in said input pipe, said input and said output pipes respectively communicating with said opposing chambers of said reset stage.

WILLIAM I. CALDWELL.

References Cited in the file of this patent
UNITED STATES PATENTS

| Number | Name | Date |
|---|---|---|
| 2,512,561 | Ziegler | June 20, 1950 |